United States Patent
Huber

(10) Patent No.: US 6,328,154 B1
(45) Date of Patent: Dec. 11, 2001

(54) FREIGHT LOADING SYSTEM

(75) Inventor: Thomas Huber, Iffeldorf (DE)

(73) Assignee: Telair International GmbH, Hausham (DE)

( * ) Notice: Subject to any disclaimer, the term of this patent is extended or adjusted under 35 U.S.C. 154(b) by 0 days.

(21) Appl. No.: 09/255,192

(22) Filed: Feb. 22, 1999

(30) Foreign Application Priority Data

Feb. 20, 1998 (DE) ............................................ 198 07 231

(51) Int. Cl.$^7$ ................................................. B65G 13/02
(52) U.S. Cl. ..................... 198/782; 198/781.06; 198/788
(58) Field of Search .............................. 198/782, 781.06, 198/788

(56) References Cited

U.S. PATENT DOCUMENTS

| | | | | |
|---|---|---|---|---|
| 2,944,297 | * | 7/1960 | Maynard ................ | 198/718 |
| 3,447,665 | * | 6/1969 | Egeland et al. ........ | 198/127 |
| 3,712,454 | * | 1/1973 | McKee .................. | 198/127 |
| 3,873,861 | * | 3/1975 | Halm .................... | 310/43 |
| 4,015,154 | * | 3/1977 | Tanaka et al. ......... | 310/42 |
| 4,437,027 | * | 3/1984 | Yamamoto et al. .... | 310/78 |
| 4,589,542 | * | 5/1986 | Steadman .............. | 198/782 |
| 4,720,646 | * | 1/1988 | Torimoto ............... | 310/71 |
| 5,183,150 | * | 2/1993 | Chary et al. ........... | 198/782 |
| 5,213,201 | * | 5/1993 | Huber et al. ........... | 198/781 |
| 6,135,269 | * | 2/1999 | Huber et al. ........... | 198/718 |

FOREIGN PATENT DOCUMENTS

| | | |
|---|---|---|
| 1 956 946 | 11/1970 | (DE) . |
| 3 919 613 | 12/1990 | (DE) . |
| 43 36 978 | 5/1995 | (DE) . |
| 195 39 627 | 5/1996 | (DE) . |
| 497 045 | 8/1992 | (EP) . |
| 355 251 | 6/1993 | (EP) . |
| WO 96/28719 | 9/1996 | (WO) . |

\* cited by examiner

Primary Examiner—Christopher P. Ellis
Assistant Examiner—Rashmi Sharma
(74) Attorney, Agent, or Firm—Knobbe, Martens, Olson & Bear, LLP

(57) ABSTRACT

A freight loading system is provided comprising at least one drive roller unit for conveying objects, in particular containers, pallets or the like, on the freight deck of an aircraft. The drive roller unit comprises at least one drive roller, which is in operative connection with a drive motor that can be controlled by way of an operator's console and which can be brought into engagement with an undersurface of an object to be conveyed. At least one sensing means comprising a measurement roller is provided and which likewise can be brought into connection with the undersurface of the object. At least one measurement sensor is also provided and is so constructed and so connected to the measurement roller or accommodated in the measurement roller that the circumferential velocity of the roller and/or a load acting upon it substantially perpendicular to the freight deck and/or a horizontal force acting on it during braking of the measurement roller, or a corresponding torque, are converted to measurement signals. These signals are sent to a control device which is in controlling or regulating connection with one or more drive motors of drive roller units installed in the freight deck. The control device is so designed that the drive motors are controlled according to the measurement signals or regulated with respect to their speed of rotation and/or torque.

11 Claims, 5 Drawing Sheets

FREIGHT LOADING SYSTEM

FIELD OF THE INVENTION

The present invention relates to a freight loading system such as is used in aircraft to convey in particular containers, pallets or the like within a cargo hold.

DESCRIPTION OF THE PRIOR ART

During the loading and unloading of aircraft, it is important that the objects to be stored in the aircraft or removed therefrom be transported into their places or out of the cargo hold as rapidly but also as reliably as possible. However, such a loading and unloading process must not only be completed in a short time, it must also take place under extremely diverse conditions. This diversity results firstly from the configuration of the objects themselves, which may have various undersurface structures or contents of various weights, and also from the position of the aircraft or of the cargo deck, which can be tilted at various angles because the positions of parked aircraft are not always optimal and can also change depending on the weight of the load. It should also be kept in mind that the bottoms of the objects to be transported can differ in their stability and in the skid-resistance of the material of which they are made. Moisture and dirt play a major role in this regard.

Finally, the operating staff has a large role in the problems at issue here. To save costs, it is desirable to minimize the number of employees, who are furthermore often unskilled and, in particular when pressed for time, may work carelessly.

In conventional systems it is very largely left to the operating staff to determine how roller drive units are controlled, and they usually work with constant conveying parameters (in particular with respect to transport speed, pressure exerted by drive rollers etc.), not taking into account the variations cited above.

The object of the invention is to provide a freight loading system that improves the loading and unloading process while reducing the work required of the operators.

SUMMARY OF THE INVENTION

According to the present invention there is provided a freight loading system for conveying an object on a freight deck of an aircraft comprising a drive roller unit with at least one drive roller which can be brought into engagement with an undersurface of the object, and with a controllable drive motor that is in operative connection with the drive roller;

a sensing means comprising a measurement roller which can be brought into connection with the undersurface of the object;

at least one measurement sensor connected to and located relative to the measurement roller in order that at least one of the circumferential velocity of the measurement roller, a load imposed on the measurement roller substantially perpendicular to the freight deck, a horizontal force acting on the measurement sensor during braking of the measurement roller, and a torque corresponding to such a horizontal force is converted into measurement signals by the measurement sensor; and a control means with an operator's console, to which the measurement signals are sent and which is in controlling connection with the drive motor of the drive roller unit in order that operation of the drive motor can be controlled and regulated according to the measurement signals.

It is an important aspect of the invention that the parameters of interest here, which vary from one object to another, are monitored directly or indirectly by the sensing means and the roller drive unit is controlled or regulated accordingly. In particular, the freight loading system in accordance with the invention comprises at least one drive roller unit to convey objects, in particular containers, pallets or the like, on the freight deck of an aircraft and least one sensing means which monitors the parameters of the object that are of interest and/or its momentary state (e.g., whether stationary or moving. Preferably, a plurality of sensing means are provided so that the movement of the objects can be monitored throughout the cargo hold.

When a sensing means or measurement roller is in close spatial proximity to a roller drive unit, if equipped with a rotation-speed sensor it can be used to regulate the speed of the drive motor for the associated roller drive unit in such a way that there is no slippage between the drive roller and the undersurface of the object to be conveyed. This is achieved quite simply by regulating the drive motor to a speed of rotation such that the circumferential velocity of the drive roller corresponds to that of the measurement roller. It is further possible, if at least two sensing means (e.g., reflection light barriers) are disposed close to one another along the transport direction instead of the measurement roller, to calculate a velocity value and adjust the drive motor for the roller drive unit that will next be encountered by the object such that the circumferential velocity of the associated drive roller corresponds substantially to this calculated velocity or, if the object is to be accelerated, is a little higher or, if the object is to be slowed, is a little lower.

Preferably, the control means is so constructed that the maximal transport velocity of an object is adjusted according to its weight or its mass in such a way that heavier objects are transported with lower maximal velocities than lighter objects. The weight or mass of the object could be input manually as a reference value, but this is relatively time-consuming. It is therefore proposed to provide at least one load sensor in the region of the entrance door to the cargo space, by means of which the weight of the object to be conveyed can be determined. In accordance with this reference value, the drive roller units are subsequently driven at higher or lower accelerations or velocities, so that on one hand the loading speed is increased while on the other hand the danger of collision damage in case of braking errors is reduced.

In another embodiment of the invention, in order to determine the weight or mass of the objects to be conveyed the forces that act during their acceleration are measured, from which the values of interest can be derived. This can be done, firstly, by measuring the moments of force acting on the drive rollers when the object is accelerated, or else the measurement rollers can be equipped with brakes and the forces measured that are exerted during the deceleration of moving objects. In the latter case, i.e. when a measurement roller equipped with a brake is used, the amount of braking force applied to this roller when a moving object is to be halted or a stationary one kept in place (e.g., on a sloping freight deck) is preferably adjusted according to the weight or mass of the object to be stopped or retained. By this means, it is possible to minimize both the electrical energy that must be drawn from the on-board supply for braking or retention and the mechanical and thermal stresses on the measurement roller or its brake.

In an embodiment of the invention in which the vertical position of the drive roller relative to the freight deck can be adjusted, the control means is so designed that the relative position of the drive roller depends on the structural characteristics and/or stability of the undersurface of the object being conveyed at the moment. In this case, for example, the maximal permitted force is brought to bear on the bottom of the object to be conveyed by way of the drive roller unit, for which purpose the unit is initially always raised from its lower, resting position into its upper, operating position until the maximal permitted raising force has been reached. As soon as a beam or shoring is detected, the drive roller is lowered, and thereafter it is raised again to the maximal limit. In particular when pallets are being loaded, this feature is helpful.

The sensing means or measurement rollers that are in direct spatial juxtaposition with drive roller units, in particular ahead of and/or after the drive roller in the transport direction, in one embodiment of the invention are used to raise the drive roller when an object arrives at the sensing means, in particular the measurement roller, and to lower it when the object leaves the measurement roller.

In one embodiment of the invention the measurement roller is constructed as a unit that can be mounted separately in the freight deck. A plurality of such measurement rollers, in particular rollers provided with braking means, can then be regarded as an independent functional unit; for instance, such units can serve practically exclusively for the braking and/or retention of objects. They can also be assigned multiple functions. For example, individual measurement rollers or groups thereof can serve first to determine the container weight while simultaneously retaining or braking a container, or they can serve as velocity sensors which also regulate the drive speed of the drive roller units. Preferably, the braking means of the measurement rollers can be controlled by way of the operator's console. In addition, automatic functions can be provided here, for instance to ensure automatic braking of objects that are being conveyed too rapidly, in particular by hand, so that no damage is caused in the cargo hold or to the containers.

The operator's console preferably comprises a remote control unit, so that an operator can accompany a container on its way through the cargo hold to its destination and back out again. As a result, the container can be better guided both by direct observation and by manual assistance. In one embodiment of the invention the operator's console comprises a control panel fastened to the aircraft in the customary way, which defines a receptacle into which the remote control unit can be removably inserted and stored, the receptacle being so shaped that when the remote control unit is contained therein, the operating members of the unit are inaccessible. When the remote control unit is taken out, the control panel can be inactivated, so that it is impossible for contradictory commands to be issued.

The present invention will now be described by way of example with reference to the accompanying drawings.

DESCRIPTION OF THE PREFERRED EMBODIMENTS

Figure 1:
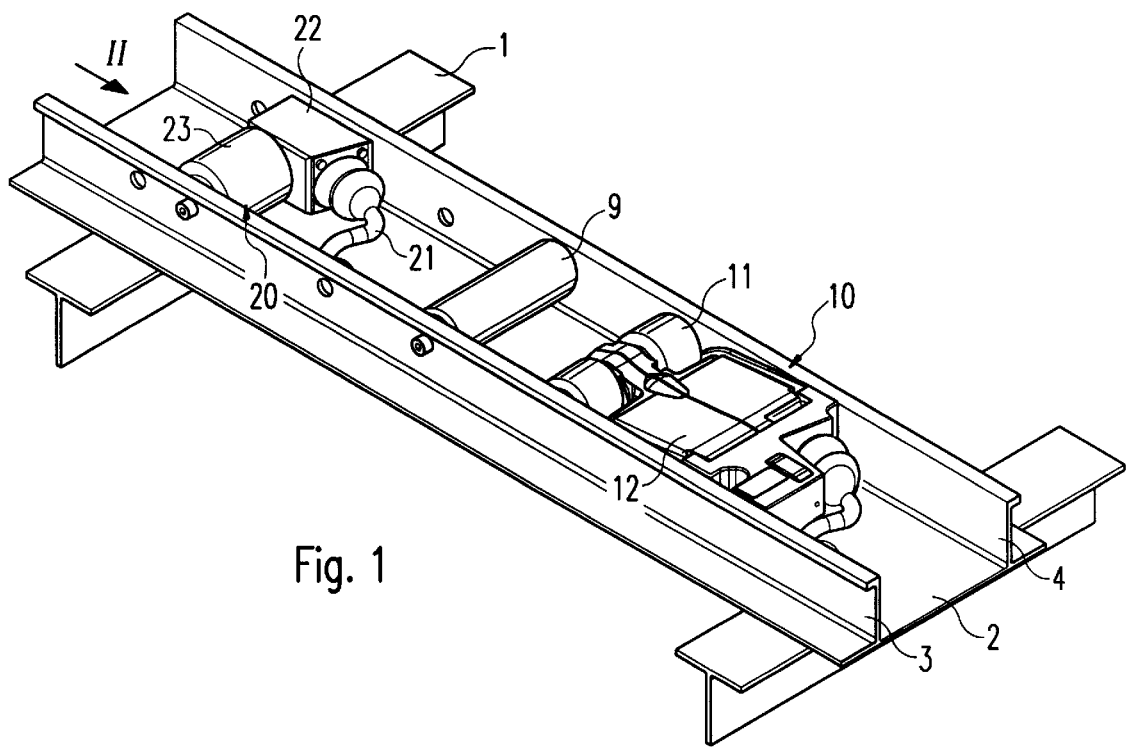
FIG. 1 is a perspective view of a combination of drive roller unit, bearing roller and measurement roller.

In the following description, the same reference numerals are used for identical components or parts with identical actions.

Figure 2:
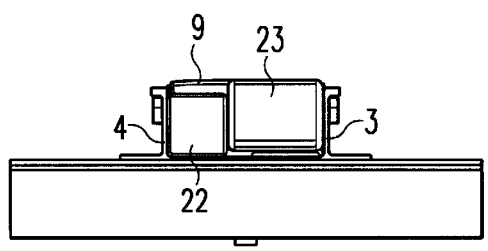
FIG. 2 is a view along the direction of arrow II in FIG. 1.

In the embodiment shown in FIG. 1 and FIG. 2, in a freight deck of which only transverse supports 1 are shown, there is disposed a receiving rail 2 with side elements 3 and 4. Fixed to the floor of the receiving rail 2, by means of threaded bolts, is a drive roller unit 10 comprising a two-part drive roller 11 that can be rotated by means of a drive motor 12. The drive roller 11 of the drive roller unit 10 can be raised from a resting position (as shown in FIG. 1) into an elevated position in which the drive roller 11 can be brought into frictional engagement with an object above the roller. The roller drive unit employed here is preferably such as is described in DE 197 19 160.

In the receiving rail 2 is also attached a load-bearing roller 9, which functions entirely passively.

Finally, there is attached in the receiving rail 2 a measurement roller 20 comprising a socket 22 to which is fixed a roller 23, as well as a connecting lead 21 by way of which a brake (not shown) to slow down the roller 23 can be controlled and through which measurement signals generated by sensors (not shown) are transmitted. One of these sensors is a rotation-speed sensor, which produces signals representing the speed of rotation or circumferential velocity of the roller 23. In addition two force sensors are provided, one of which measures a load imposed vertically on the roller 23 while the other measures a load acting horizontally (in the direction of the arrow II) or a braking force that arises during braking of the roller 23 when an object being conveyed moves over the roller and the object's motion is slowed.

Figure 3:
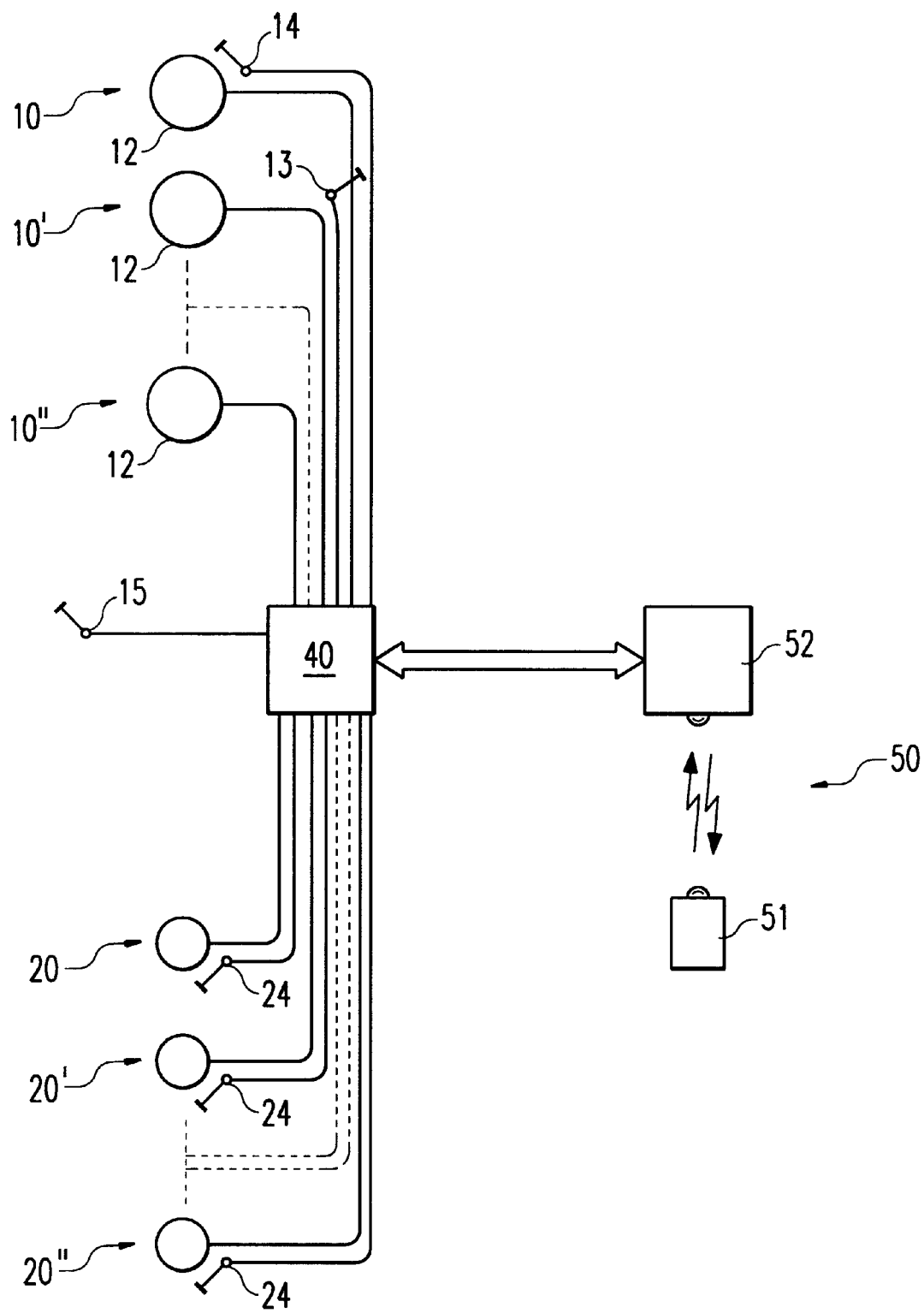
FIG. 3 is a schematic drawing of circuitry connecting a control apparatus with sensing means and roller drive units.

As shown in FIG. 3, several drive roller units 10, 10', 10" with drive motors 12 are connected to a control apparatus 40 in such a way that the control apparatus 40 can control the drive motors 12. In addition there are provided a current sensor 13 to determine the propulsive force generated by the drive motor 12 in order to convey an object, as well as a rotation-speed sensor 14 that detects the circumferential velocity of the drive roller 11 and delivers a corresponding signal to the control apparatus 40.

The control apparatus 40 is additionally connected to several measurement rollers 20, 20', 20", which are provided with braking means controllable by the control apparatus 40. Associated with the measurement rollers 20, 20', 20" are measurement sensors 24 such as have just been described. Depending on the intended application, a measurement roller 20 may be provided with one sensor or several, for different purposes. In addition, a load-measuring sensor 15 (or groups thereof) can be provided, for example in order to determine the weight of an object to be conveyed.

The control apparatus 40 is connected to an operator's console 50, which comprises a control panel 52 permanently installed in the aircraft as well as a remote control unit 51, so that the operator's console 50 can either be used by an operator at its site or driven by way of the remote control unit.

Figure 4:
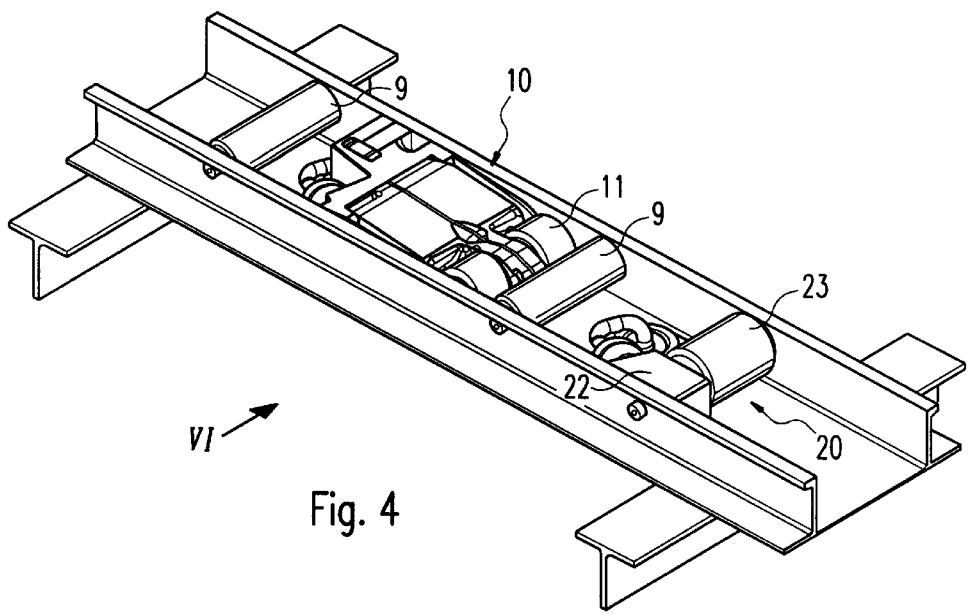
FIG. 4 is a view similar to FIG. 1 but with the various components differently arranged.
Figure 5:
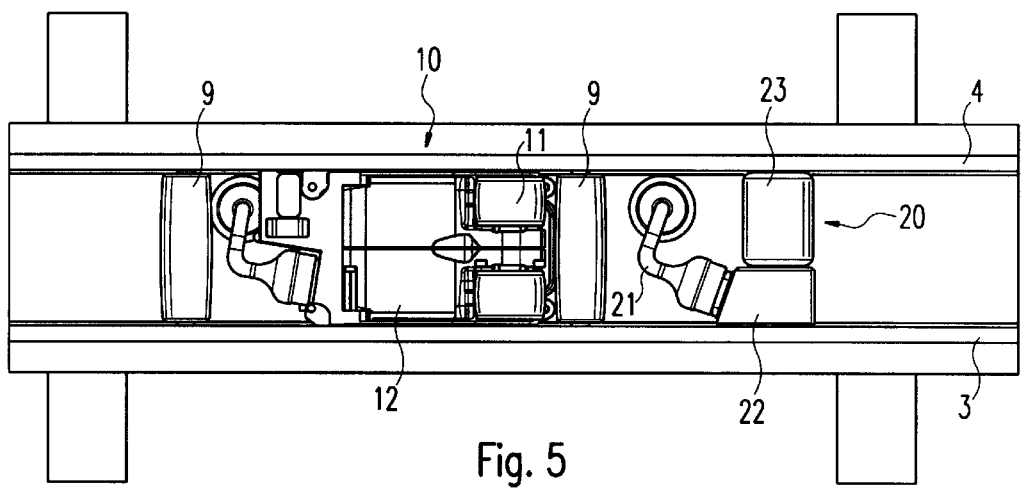
FIG. 5 is a plan view of the arrangement shown in FIG. 4.
Figure 6:
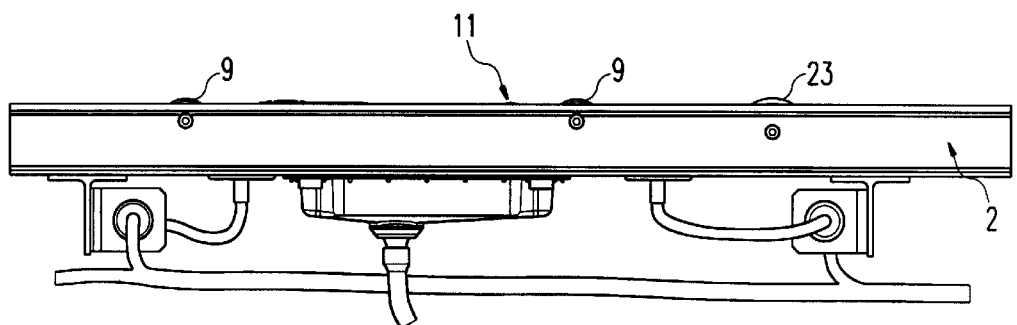
FIG. 6 is side view in the direction of arrow VI of the arrangement shown in FIG. 4.

The embodiment of the invention shown in FIGS. 4, 5 and 6 differs from the embodiment shown in FIGS. 1 and 2 in that the components are considerably more compactly arranged, the measurement roller 20 being in extremely close spatial proximity to the drive roller unit 10. This arrangement enables particularly precise anti-skid regulation and control of the process of raising the drive roller unit 10. This embodiment further comprises an additional passive roller 9, so that a container travelling over the arrangement is securely supported even when the drive roller 11 of the drive roller unit 10 is completely retracted.

Figure 7:
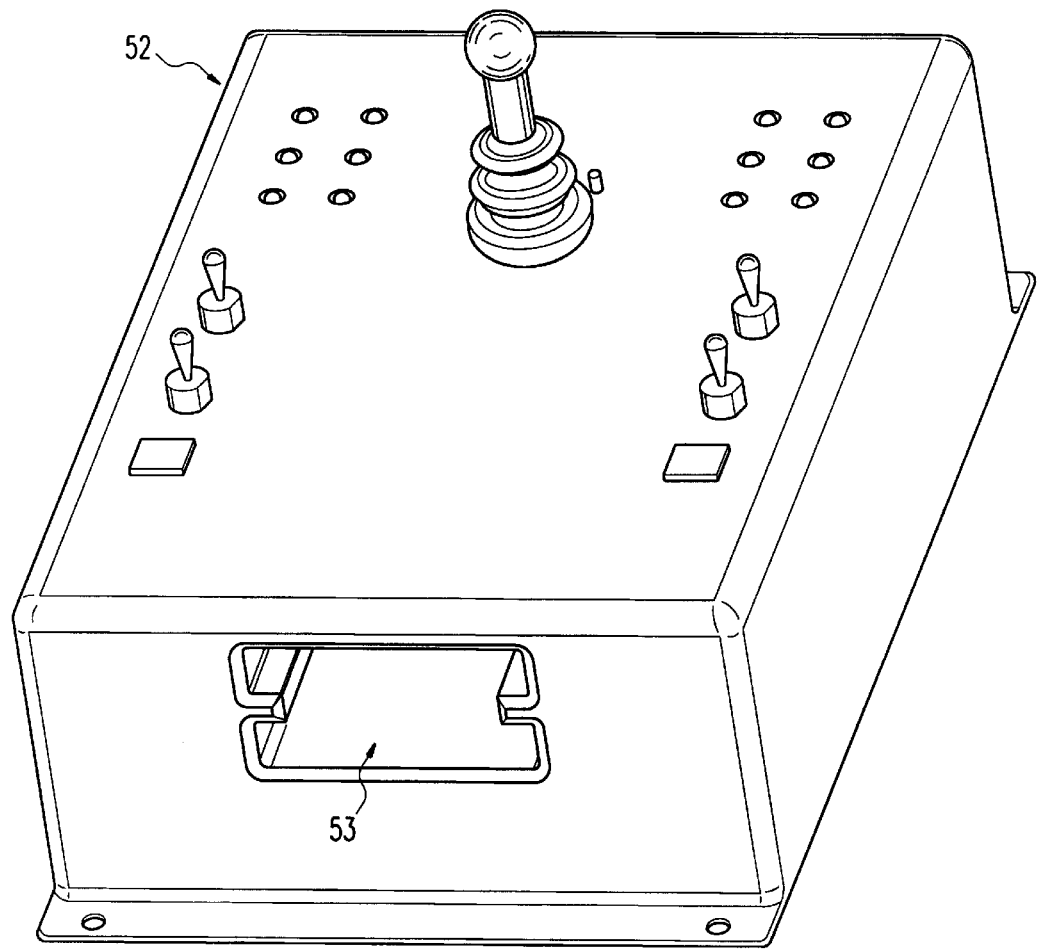
FIG. 7 is a perspective view of an operator's console.
Figure 7:
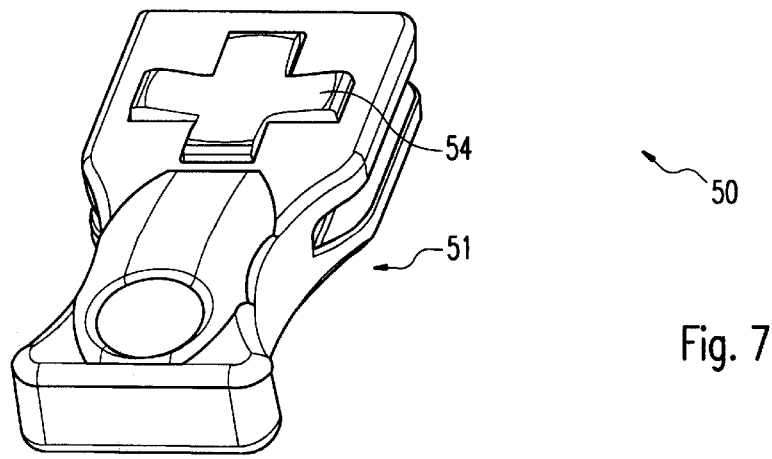

In FIG. 7 is shown an operator's console that comprises a control panel 52 for permanent fixment in place as well as a remote control unit 51. The remote control unit 51 can be inserted into a receptacle 53 in the control panel 52 when not needed. In this case a control member 54 provided on the remote control unit 51 is hidden within the receptacle 53, so that the system can be operated only by way of the control members provided on the control panel 52. Preferably there is provided within the control panel 52 or in its receptacle 53 a switch so constructed that when the remote control unit 51 is taken out, the control members of the control panel 52 are inactivated.

The connection indicated by arrows in FIG. 3 can be made between the remote control unit 51 and the control panel 52. In a preferred embodiment of the invention, however, the signal is transmitted to the control apparatus 40 by way of the control leads of the drive roller units mounted in the cargo space. For this purpose the infrared sensors customarily mounted on the drive roller units (where they are employed in photoelectric barriers for the detection of objects to be conveyed) are used, their infrared signals being sent from an appropriate infrared transmitter to the remote control unit 51. The signals transmitted by the remote control unit are distinguished from the signals detected by these infrared sensors in their capacity as elements of photoelectric barriers by appropriate coding and filtering. By this means it is possible not only to limit the number of sensors, which are present in the aircraft in any case in the drive roller units; more importantly, it also becomes possible to distribute "receiving stations" for purposes of remote control over the entire freight deck of the aircraft, so that on one hand optimal reception and hence optimal remote control are ensured, while on the other hand elaborate, expensive, heavy and vulnerable cable arrangements can be eliminated.

The concept just described, of a remote control system with distributed receivers that comprise the receivers basically provided for photoelectric barriers, is regarded as independently inventive.

Figure 8:
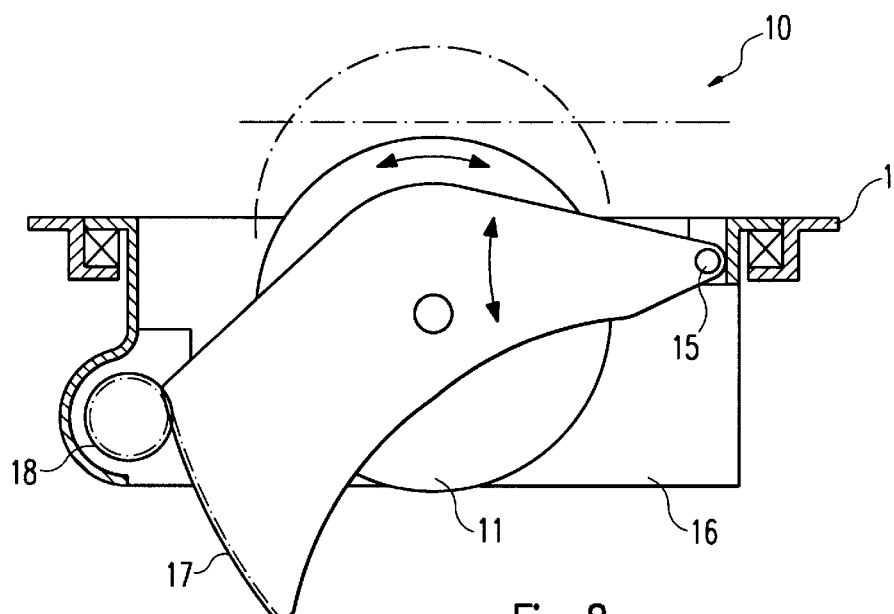
FIG. 8 is a schematic drawing, partially in section, of a roller drive unit that can be swiveled and raised.
Figure 9:
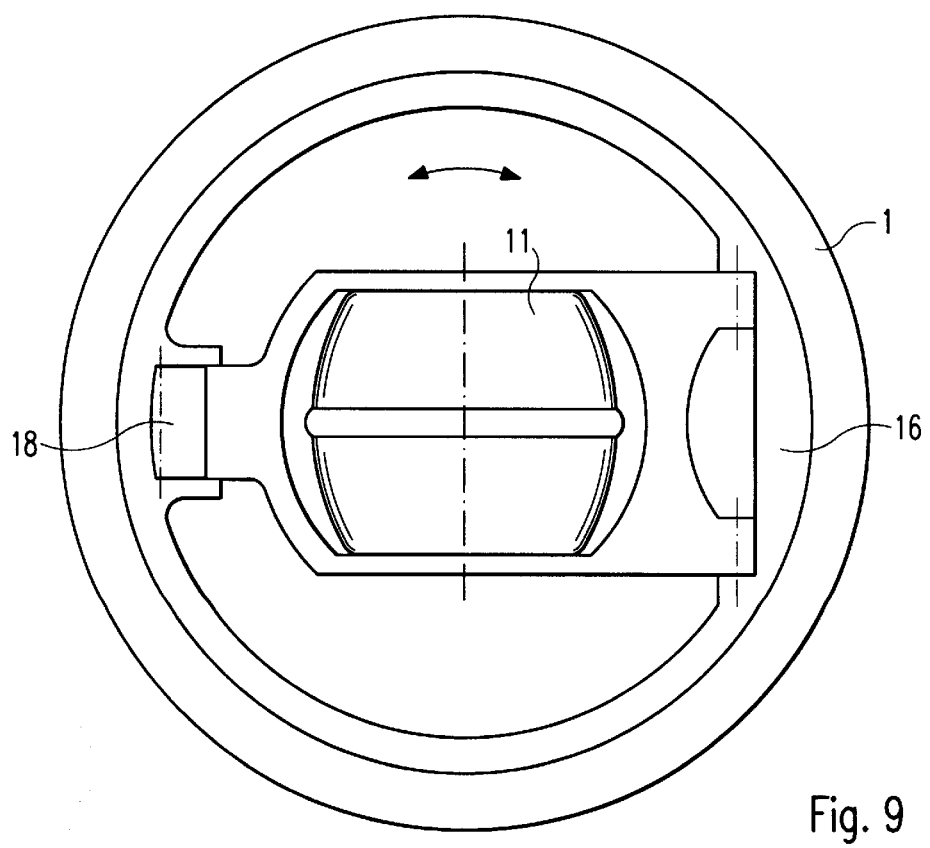
FIG. 9 is a plan view of the roller drive unit shown in FIG. 8.

In FIGS. 8 and 9 an embodiment of a drive roller unit is shown in which a dished frame 16 is mounted on a base in the freight deck 1. Within the dished frame 16 a one-armed lever or rocker 17 is disposed so that it can rotate about a horizontal axle that simultaneously forms or incorporates a force-measuring sensor 15. The rocker 17 can be raised by means of a lifting motor 18, so that the drive roller 11 is swiveled out of a retracted, resting position into an elevated, operating position (as shown by the dashed line). The horizontal dot-dashed line indicates the plane in which the surfaces of the non-powered roller 9 and the measurement rollers 20 lie. Accordingly, also within this plane are the lowest points of the objects to be conveyed, apart from any exceptions resulting from damage.

The concept of an independent measurement roller, which is equipped with a controllable brake, is also regarded as having independent inventive content. A measurement and brake roller of this kind can be used in a variety of ways, also in addition to previously present drive units or in ball mats or the like.

It will be evident from the above that the present invention also relates to a method for conveying containers, in which the characteristics disclosed above are considered relevant in particular with regard to the use of different transport velocities and transport accelerations in relation to the mass of the objects to be conveyed.

The particular form of the operator's console with remote control unit is likewise considered as having independent inventive content.

What is claimed is:

1. A freight loading system for conveying an object on a freight deck of an aircraft comprising:
    a drive roller unit with at least one drive roller which can be brought into engagement with an undersurface of the object, and with a controllable drive motor that is in operative connection with the drive roller;
    a sensing means comprising a measurement roller which can be brought into connection with the undersurface of the object;
    at least one measurement sensor connected to and located relative to the measurement roller in order that at least one of a circumferential velocity of the measurement roller, a load imposed on the measurement roller substantially perpendicular to the freight deck, a horizontal force acting on the measurement sensor during braking of the measurement roller, and a torque corresponding to such a horizontal force is converted into measurement signals by the measurement sensor; and
    a control means with an operator's console, to which the measurement signals are sent and which is in controlling connection with the drive motor of the drive roller unit in order that operation of the drive motor can be controlled and regulated according to the measurement signals.

2. A freight loading system as claimed in claim 1, wherein the control means regulates a rotation speed of the drive motor in accordance with the measurement signals in such a way as to avoid slippage between the undersurface of the object and the drive roller.

3. A freight loading system as claimed in claim 1, wherein the control means is so constructed that a maximal transport velocity of an object is adjusted according to its weight or its mass in such a way that heavier objects are transported with lower maximal velocities than lighter objects.

4. A freight loading system as claimed in claim 1, wherein the vertical position of the drive roller relative to the freight deck can be adjusted, and wherein the control means is configured to adjust the relative vertical position of the drive roller .

5. A freight loading system as claimed in claim 1, wherein the sensing means is positioned relative to the drive roller in a transport direction in such a way that when an object arrives at and leaves the sensing means, the drive roller is raised and lowered respectively.

6. A freight loading system as claimed in claim 1, wherein the drive motor comprises one of a current sensor and a torque sensor, the output signals of which are transmitted to the control means during acceleration of the object so that the weight or the mass of the object can be derived.

7. A freight loading system as claimed in claim 3, wherein the drive roller is constructed so that it can be raised from a lower, resting position into an upper, operating position and is provided with a measuring means to measure the weight of the object, the output signals of which measuring means are sent to the control means.

8. A freight loading system as claimed in claim 1, wherein the sensing means comprising the measurement roller is constructed as a unit that can be mounted separately in the freight deck.

9. A freight loading system as claimed in claim 1, wherein the operator's console comprises a remote control unit.

10. A freight loading system as claimed in claim 9, wherein the operator's console comprises a control panel for fitment to the aircraft and defines a receptacle into which the remote control unit can be removably inserted for storage, the receptacle being shaped so that when the remote control unit is located in the receptacle, operating members provided on the remote control unit are inaccessible.

11. A freight loading system for conveying an object on a freight deck of an aircraft comprising:

a drive roller unit with at least one drive roller which can be brought into engagement with an undersurface of the object, and with a controllable driver motor that is in operative connection with the drive roller;

a sensor device comprising a measurement roller which can be brought into connection with the undersurface of the object;

at least one measurement sensor connected to and located relative to the measurement roller, the measurement sensor configured to generate measurement signals corresponding to operational parameters, wherein the operational parameters include a circumferential velocity of the measurement roller, a load imposed on the measurement roller substantially perpendicular to the freight deck, a horizontal force acting on the measurement sensor during braking of the measurement roller, and a torque corresponding to such a horizontal force; and a controller receiving the measurement signals and being in controlling connection with the drive motor to control and regulate the drive motor in accordance with the measurement signals, wherein the controller includes an operator's console.

* * * * *